United States Patent
Iofis

(10) Patent No.: US 8,189,924 B2
(45) Date of Patent: May 29, 2012

(54) PHISHING ABUSE RECOGNITION IN WEB PAGES

(75) Inventor: Vadim Iofis, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 896 days.

(21) Appl. No.: 12/252,302

(22) Filed: Oct. 15, 2008

(65) Prior Publication Data
US 2010/0092076 A1    Apr. 15, 2010

(51) Int. Cl.
*G06K 9/00* (2006.01)
*G06K 9/62* (2006.01)
*G06K 9/68* (2006.01)

(52) U.S. Cl. ........ 382/216; 382/118; 382/162; 382/218; 382/219

(58) Field of Classification Search ............. 382/216, 382/162, 218, 219
See application file for complete search history.

(56) References Cited

U.S. PATENT DOCUMENTS

| | | | | |
|---|---|---|---|---|
| 5,509,083 | A * | 4/1996 | Abtahi et al. | 382/124 |
| 8,045,808 | B2 * | 10/2011 | Oliver | 382/229 |
| 8,098,939 | B2 * | 1/2012 | Oliver | 382/229 |

OTHER PUBLICATIONS

Anthony Y. Fu; Liu Wenyin; Xiaotie Deng; , "Detecting Phishing Web Pages with Visual Similarity Assessment Based on Earth Movers Distance (EMD)," Dependable and Secure Computing, IEEE Transactions on , vol. 3, No. 4, pp. 301-311, Oct.-Dec. 2006.*
Morris, Evan, "Sampling from Small Populations," webpage: http://uregina.ca/~morrisev/Sociology/Sampling%20from%20small%20populations.htm, downloaded Oct. 15, 2008.

* cited by examiner

*Primary Examiner* — Stephen R Koziol
*Assistant Examiner* — Utpal Shah
(74) *Attorney, Agent, or Firm* — Hickman Palermo Truong Becker Bingham Wong LLP

(57) ABSTRACT

A method of identifying potential phishing abuse images includes: producing a first color map that represents a subset of color values and pixel locations within a base image; producing a second color map that represents color values and pixel locations within a target image; selecting an alignment the first color map with the second color map such that at least some pixel locations of the first color map align with at least some pixel locations of the second color map; determining a measure of color value matching of aligned pixel locations for the selected alignment; and repeating the acts of selecting and determining until a prescribed threshold measure of color value matching is determined for at least one of the selected alignments or until an evaluation limit is reached.

20 Claims, 9 Drawing Sheets

| S | S | S | S | S | S | S |
|---|---|---|---|---|---|---|
| $A_{12}$ | $C_{13}$ | $A_{19}$ | $B_{20}$ | $B_{21}$ | $B_{22}$ | $A_{26}$ | $A_{27}$ | $C_{28}$ | $B_{29}$ | $B_{30}$ | $B_{31}$ |

*FIG. 2B*

| | S | S | S | |
|---|---|---|---|---|
| $A_{33}$ | $C_{34}$ | $A_{35}$ | $C_{36}$ | $C_{37}$ | $B_{38}$ | $B_{39}$ | $B_{40}$ |

*FIG. 2C*

| $C_{13}$ | $B_{21}$ | $A_{27}$ | $C_{28}$ | $B_{29}$ | $C_{36}$ | $B_{38}$ |

Base Image

Target Image

Pass 1: row 1; offset 0
score = 5

Pass 2: row 1; offset 4 pixels
score = 4

Pass 3: row 2; offset 0
score = 20

PHISHING ABUSE RECOGNITION IN WEB PAGES

BACKGROUND OF THE INVENTION

1. Field of the Invention

The invention relates in general to computer networks, and more particularly, to combating occurrences of phishing abuse on the Internet.

2. Description of the Related Art

Phishing is a term used to refer to a practice of luring unsuspecting Internet users to a false web site by using authentic-looking email or web pages with legitimate enterprise's mark, design or logo, in an attempt to steal confidential information such as passwords, financial or personal data, or launch a virus attack. The term phishing often is used to refer to creation of a replica of a legitimate web site in an effort to trick fooling unsuspecting Internet users into submitting personal or financial information or passwords.

Many web pages include brand logo or trademark or other distinctive or valuable images that serve to identify a trusted source of goods or services. Increasingly, such images have become the target of phishing abusers. Phishing often involves the use of popular or well-known images to trick web users into believing that a web page is associated with the owner of a trusted source, e.g., a company or individual, generally associated with the image. In order to trick such internet users, an image of a brand logo may be incorporated within a web page that has not been authorized by the owner of the image. Often, phishing abusers embed unauthorized images within or among other images on the unauthorized web page. The presence of the unauthorized image is intended to imbue the web page with an air of legitimacy. Thus, phishing typically involves an unlawful use of proprietary images to perpetuate what amounts to fraud or theft. There is a need to combat such phishing abuse. More specifically, there has been a need to identify brand logo or trademark or other distinctive images appearing on an unauthorized web page even if such images are embedded within or among other images on the page.

SUMMARY OF THE INVENTION

In one embodiment of the present invention, a method of identifying potential phishing abuse images, includes: producing a first color map that represents a subset of color values and pixel locations within a base image; producing a second color map that represents color values and pixel locations within a target image; selecting an alignment the first color map with the second color map such that at least some pixel locations of the first color map align with at least some pixel locations of the second color map; determining a measure of color value matching of aligned pixel locations for the selected alignment; and repeating the acts of selecting and determining until a prescribed threshold measure of color value matching is determined for at least one of the selected alignments or until an evaluation limit is reached. One or more values for the selected alignments can be saved in a computer-readable medium (e.g., measured values for color matching can be saved directly or through some related characterization).

According to one aspect of this embodiment, producing the first color map may include sampling a threshold number of pixel locations of the base image, wherein at least some pixel locations of the base image are excluded from the first color map.

According to another aspect, the method may further include: selecting the base image from a set of candidate base images by prioritizing the candidate base images according to color similarity with the target image.

According to another aspect, selecting the alignment of the first color map with the second color map may include aligning a first pixel of the first color map with a first pixel of the second color map; and aligning additional pixels of the first color map with additional pixels of the second color map according to locations of the additional pixels in the first pixel map relative to the first pixel of the first color map and locations of the additional pixels in the second color map relative to the first pixel of the second color map.

According to another aspect, wherein determining the measure of color value matching for the alignment may include calculating a sum of color matching values for pairs of aligned pixels, wherein the color matching values correspond to a degree of similarity in the color values of aligned pixels.

According to another aspect, the alignment may be a first alignment and the method may further include: selecting a second alignment of the first color map with the second color map, wherein selecting the second alignment includes: aligning the first pixel of the first color map with a second pixel of the second color map; and aligning additional pixels of the first color map with additional pixels of the second color map according to locations of the additional pixels in the first color map relative to the first pixel of the first color map and locations of the additional pixels in the second color map relative to the second pixel of the second color map. Additionally with respect to this aspect, the method may further include selecting the second pixel of the second color map by offsetting the first pixel of the second color map along a row or a column of the second pixel map.

Additional embodiments relate to an apparatus for carrying out any one of the above-described methods, where the apparatus includes a computer for executing instructions related to the method. For example, the computer may include a processor with memory for executing at least some of the instructions. Additionally or alternatively the computer may include circuitry or other specialized hardware for executing at least some of the instructions. Additional embodiments also relate to a computer-readable medium that stores (e.g., tangibly embodies) a computer program for carrying out any one of the above-described methods with a computer. In these ways the present invention enables improved methods and systems for combating phishing abuse.

BRIEF DESCRIPTION OF THE DRAWINGS

FIGS. 2A-2D are illustrative simplified drawings representing a base image (FIG. 2A) together with a color map (FIG. 2B), color map sample (FIG. 2C) and color palette (FIG. 2D) that can be produced for the base image in accordance with the process of FIG. 1.

DETAILED DESCRIPTION OF EMBODIMENTS OF THE INVENTION

The following description is presented to enable any person skilled in the art to make and use a method and system to identify potential phishing abuse practiced over the Internet in accordance with embodiments of the invention, and is provided in the context of particular applications and their requirements. Various modifications to the preferred embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and processes are shown in block diagram form in order not to obscure the description of the invention with unnecessary detail. Thus, the present invention is not intended to be limited to the embodiments shown, but is to be accorded the widest scope consistent with the principles and features disclosed herein.

A base image, for example, may comprise a brand logo or trademark or other distinctive or valuable image associated with a trusted source of goods or services. A system in accordance with embodiments of the invention may be employed to evaluate a huge number of web pages for illicit usage of any of a large number of base images. For example, a web crawler may be employed to crawl the web and to identify perhaps millions of web pages to be evaluated to determine for each such web page, whether there is an illicit use of any one or more of thousands of different base images. A search for potential phishing abuse on such a large volume of web pages necessitates an efficient system and method to identify and evaluate potentially illicit images.

Figure 1:
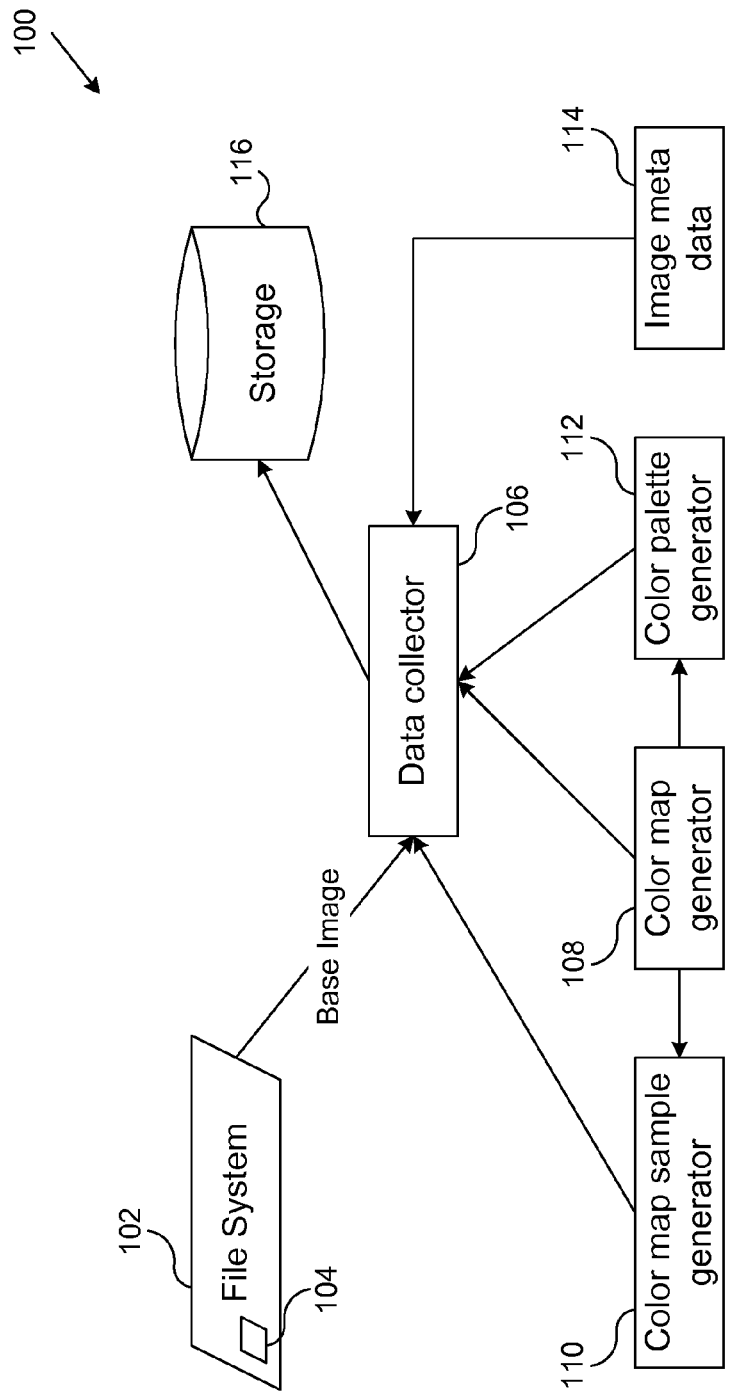
FIG. 1 is an illustrative flow diagram of a process to produce base image information for use to identify potentially illicit usage of a base image in accordance with some embodiments of the invention.

FIG. 1 is an illustrative flow diagram of a process 100 to produce base image information for use to identify potentially illicit usage of a base image in accordance with some embodiments of the invention. This process may be performed for each of many base images, perhaps many thousands or even million of base images, in order to produce base image information useful for efficiently identifying potential phishing abuse. A file system 102 is provided includes image files 104 for a plurality of base images, perhaps many thousands, that are at risk of phishing abuse. A given image file 104 typically contains computer readable code used by a computer system to generate a display of a base image. A base image and its corresponding file, for instance, may be created using graphic image creation tools such as Adobe® Photoshop, Corel® Photo-Paint, Corel® Paint Shop Pro, and GIMP (Gnu Image Manipulation Program). Base image information is produced for each such image so that such information can be used to detect possible phishing abuse.

Figure 2A:
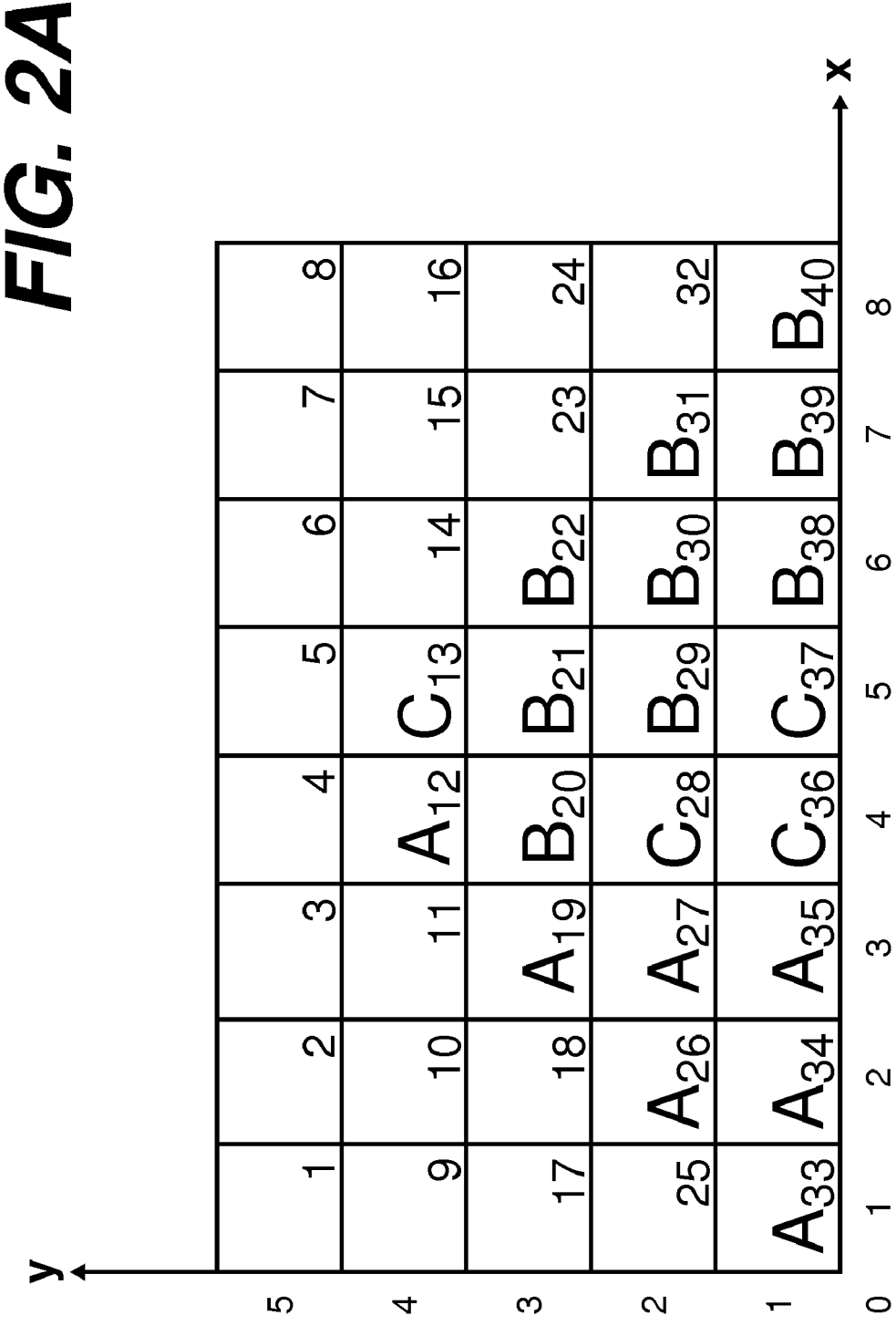

FIGS. 2A-2D are illustrative simplified drawings representing a base image (FIG. 2A) together with a color map (FIG. 2B), color map sample (FIG. 2C) and color palette (FIG. 2D) that can be produced for the base image in accordance with the process of FIG. 1. It will be appreciated of course that a greatly simplified base image that includes only forty (40) pixels is shown in FIG. 2A for the purpose of illustration, and that an actual base image may have several hundred or even several thousand pixels, each with a corresponding color value and pixel location. The color and arrangement of these pixels determines the overall appearance of the base image. FIG. 2A is an illustrative drawing of an example 8×5 pixel array in which pixels encompassed within an example base image are labeled with letters "A", "B" or "C" representing different color values. FIG. 2B is an illustrative drawing representing a color map comprising a series of pixel color information values associated with two-dimensional locations of pixels within the base image. FIG. 2C is an illustrative drawing representing a color map sample that includes color values for a subset of the pixel locations represented within the color map of FIG. 2B. FIG. 2D is an illustrative drawing representing a color palette that indicates the range of colors contained within the base image of FIG. 2A.

Referring again to FIG. 1, a base image file 104 obtained from a file system 102 is provided to a data collector 106, which is a central mechanism that collects relevant data for the base image and provides temporary storage in memory before sending the data to a storage device 116. A color map generator block 108 interacts with the data collector 106 and produces a color map that comprises color value information and vertical and horizontal position information for each pixel location within the base image. In some embodiments, color values are stored as a 24-bit hexadecimal value, in the format "RRGGBB"—two bytes for red, green and blue channels, which is temporarily stored in the data collector 106.

The following is a simplified illustrative example of a base image comprising only four pixels, where the values represent hexadecimal color values for the pixels:

[0xffffff, 0xffffff]
[0x000000, 0x000000]

The dimensions of this example base image are 2×2—two pixels in width by two pixels in height.

The color map generator block 108 converts this simple matrix into a one-dimensional series of values that represent pixel color information:

[0xffffff, 0xffffff, 0x000000, 0x000000]

Dimension information, such as the image width and height, is collected during the image acquisition process by the data collector 106 and sent to the storage device 116 in additional data fields along with the color map. Based on image with and height, one can reconstruct the original image structure, including, for example, values for vertical and horizontal coordinates of the pixels. These coordinate values are then used in the scanning and matching process so that corresponding pixels are matched when scanning the arrays. Storing the color information as a series of values simplifies storage and scanning operations. Because image dimensions have also been stored, no information about the image is lost during this conversion step.

If a background color for the base image is specified, then color values within the base image color map that match the background color value can be removed. Typically, background color is white, so assuming that the color value [0xffffff] corresponds to the color white, the series of color map values becomes

[ . . . 0x000000, 0X000000]

The position of all base image pixels is preserved since background color pixels are replaced by blank entries (e.g., null entries) without disturbing the pixels' position coordinates (e.g., horizontal/vertical, x/y). When background color is filtered out in this manner, this can greatly improve scanning accuracy and performance. For instance, in some embodiments, each time position and color values match between a base and target image, a "similarity score" is incremented by one. Removal of background color values from the base image sample prevents incrementing of such similarity score based upon matching that is merely indicative of a target image's matching with a base image's background color. Thus, filtering out such background color information avoids skewing a similarity score that otherwise might arise through background color matching. Removal of such background color information also reduces the number of pixels to be scanned, sometimes by 50% or more, when all irrelevant (background) pixels are removed.

Referring once again to FIG. 2A, each example pixel in the array is assigned a unique numeric value indicative of its position. The base image encompasses pixel locations that contain color values (i.e., "A", "B" or "C"). Referring to the illustrative drawing of FIG. 2B, the color map generator 108 produces the series color values that are ordered based upon pixel locations of color values within the base image. For example, the color value $A_{12}$ in FIG. 2B indicates that color "A" (which may be represented in a 24 bit RRGGBB format) associated with location 12, which corresponds to location (4, 4) in the base image map of FIG. 2A.

Referring again to FIG. 1, a color map sample generator block 110 interacts with the color map generator 108 to access the color map and to produce a color map sample for the base image. The color map sample generator 110 then interacts with the data collector 106 by sending a sample data set to the data collector 106, which then sends the sample data set to the storage device 116. In some embodiments, the color map sample generator 110 selects a random sampling of color value information entries from the series of color values produced by the color map generator 108, which is stored temporarily in the data collector 106. A minimal number of required pixels is determined by a formula for normal approximation to the hypergeometric distribution, which is typically used in statistics for sampling a 'small population':

$$n=(N*z^2*p*q)/(E^2*(N-1)+z^2*p*q)$$

where, n is the required sample size; N is the population size (e.g., total number of pixels); p and q are the population proportions; z is a value that specifies a desired level of confidence. E sets an accuracy of sample proportions. (See, for example, "Sampling from Small Populations" by Evan Morris, downloaded from Internet site uregina.ca/~morrisev.)

A random sample of pixel color value/location pairs is selected from the color map (e.g., by using a random number generator to select elements of the color map). These sample color value/location pairs (base image pixel information) are compared with pixels of target images, as explained below with reference to FIGS. 3-7, to determine whether any one or more of the target images are suspected to represent illicit phishing images. A 'small population' formulation is a useful mechanism to determine an optimal sample size since in most cases base images contain no more than a few thousand pixels. Given the small population sample size approach, typically only about 20% of foreground pixels (e.g., all pixels not corresponding to a predetermined background color) need be compared with target image pixels in each scanning pass in order to identify potential phishing abuse, while maintaining a relatively small statistical margin of error of perhaps about only 5%. The use of such a smaller sampling of base image pixel information vastly improves scanning performance since fewer pixels need be compared.

Referring to FIG. 2C, there is shown an example color map sample produced by the color sample generator 110 in which color values have been selected at random from the series of color values of FIG. 2B (as indicated by an "S" above selected pixels). Note that the relative ordering of color values in the sample is retained, and that sample values need not be contiguous. In other words, color values are selected from random pixel locations within the base image of FIG. 2A.

Referring to FIG. 1, a color palette generator 112 determines the range of colors present in the base image. Specifically, the color palette generator 112 determines the set of unique color values in the color map produced by the color map generator 108, which is stored in memory in the data collector 106 The color palette provides criteria for a threshold determination of similarity between the base image and a target image as explained more fully below.

Referring to FIG. 2D, there is shown an example color palette produced by the color palette generator 112 for the base image of FIG. 2A. Three color values, "A", "B" and "C" are included in the base image. In some embodiments, each is represented as a unique 24 bit value in the RRGGBB format described above. Therefore, those three color values are included in the color map of FIG. 2D.

The base image information, including color map information produced by generator 108, color map sample information produced by generator 110 and color palette information produced by generator 112, is provided to the data collector 106, which sends the complete data set to the storage device 116. Image meta-data 114 such as width and height is calculated during the image acquisition process to identify the base image information. The base image information together with the meta-information 114 is stored in a database 116. In some embodiments, the base image information is stored in the form of text strings in a database such as an SQlite database, for example.

Figure 3:
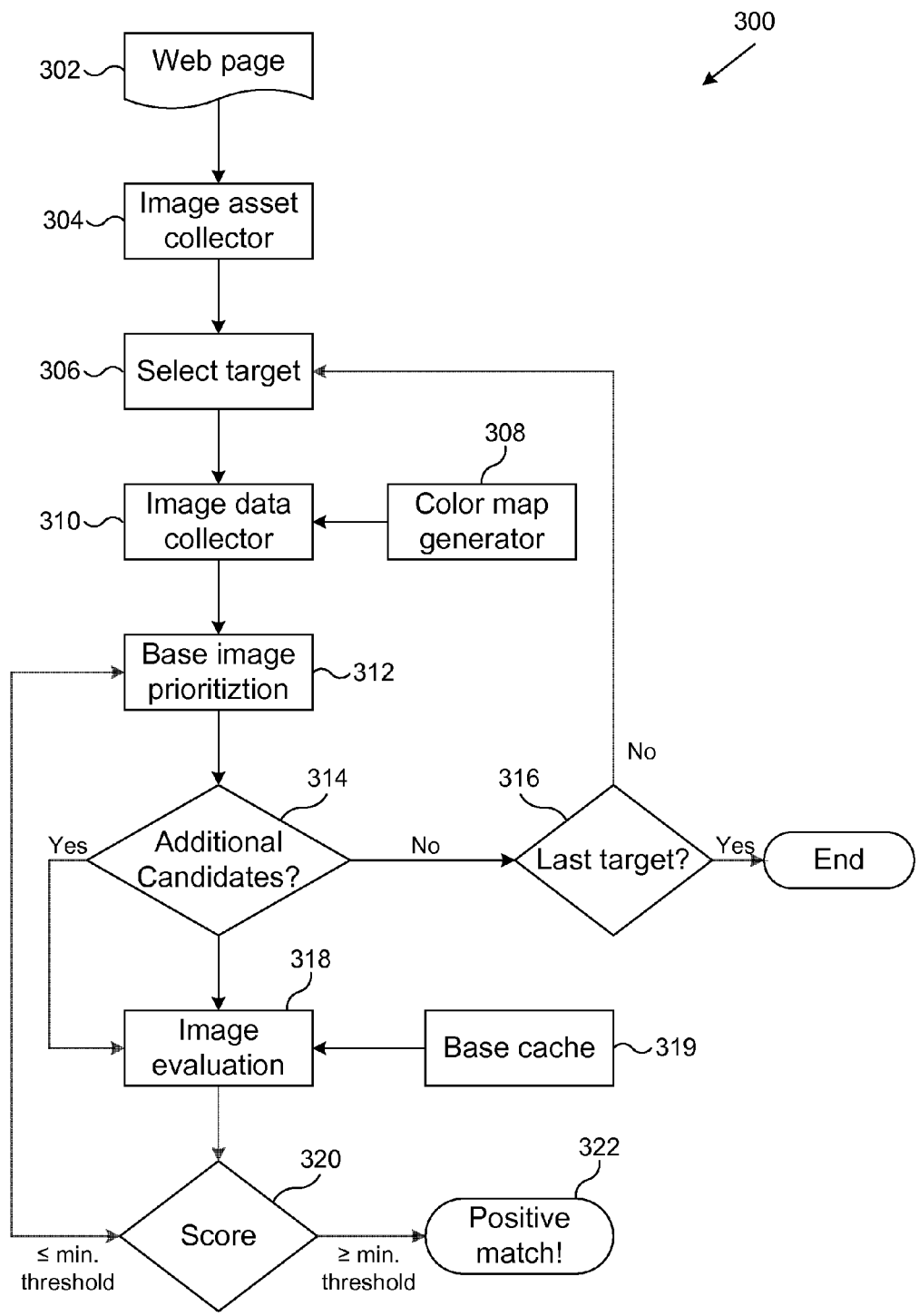
FIG. 3 is an illustrative drawing of a web page scan process that uses base image information to identify possible phishing abuse images in accordance with some embodiments of the invention.

FIG. 3 is an illustrative drawing of a web page scan process 300 that uses base image information to identify possible phishing abuse images in accordance with some embodiments of the invention. A web page 302 is selected for investigation. Image asset collector block 304 collects one or more target images from the selected page. A web page may include numerous images, and individual images may be gathered and targeted for investigation, for example, using existing methods such as by searching for an "img" tag in the page HTML code using regular expressions.

Target selection block 306 selects an image from among the one or more collected images to become the next target to be evaluated. Color map generator block 308 accesses color information associated with the currently selected target image and assigns a color palette to such target image. Image data collector block 310 collects color palette information assigned to the current target image. Base image prioritization block 312 prioritizes base images represented within the file system 102 based upon the degree of similarity of their respective color palettes (e.g., FIG. 2D) and the color palette of the currently selected target image gathered by block 310. As explained below, this prioritization based upon color palette similarity also can be used to as an initial threshold determination to identify base images that are so dissimilar to the currently selected target image, that no further evaluation is merited.

Decision block 314 selects a base image according to a priority order determined by block 312 for evaluation against the currently selected target image. If decision block 314 determines that there are no additional base images to be evaluated, then the process proceeds to decision block 316, which determines whether there are additional target images from the selected web page that have not yet been evaluated. If decision block 316 determines that there are additional target images to be evaluated, then the process loops back to block 306, which selects a next image from among the one or more collected images to be evaluated. If decision block 316 determines that there are no more target images to be evaluated, then the process ends.

On the other hand, if decision block 314 determines that there are additional base images to be evaluated then image evaluation block 318 accesses base image information from a base cache 319 in the database 116 and compares it with the currently selected target image. Decision block 320 determines whether the currently selected base image meets a prescribed level of similarity to the currently selected target image so as to indicate that such selected target image should be identified as a possible phishing image. If decision block 320 determines a prescribed threshold level of similarity then a positive match is identified, and the selected web page is identified as a suspected phishing page. If decision block 320 determines that the currently selected image does not meet the prescribed threshold level of similarity then the process loops back to block 312, and decision block 314 selects a next target image in the determined prioritization order.

Figure 4:
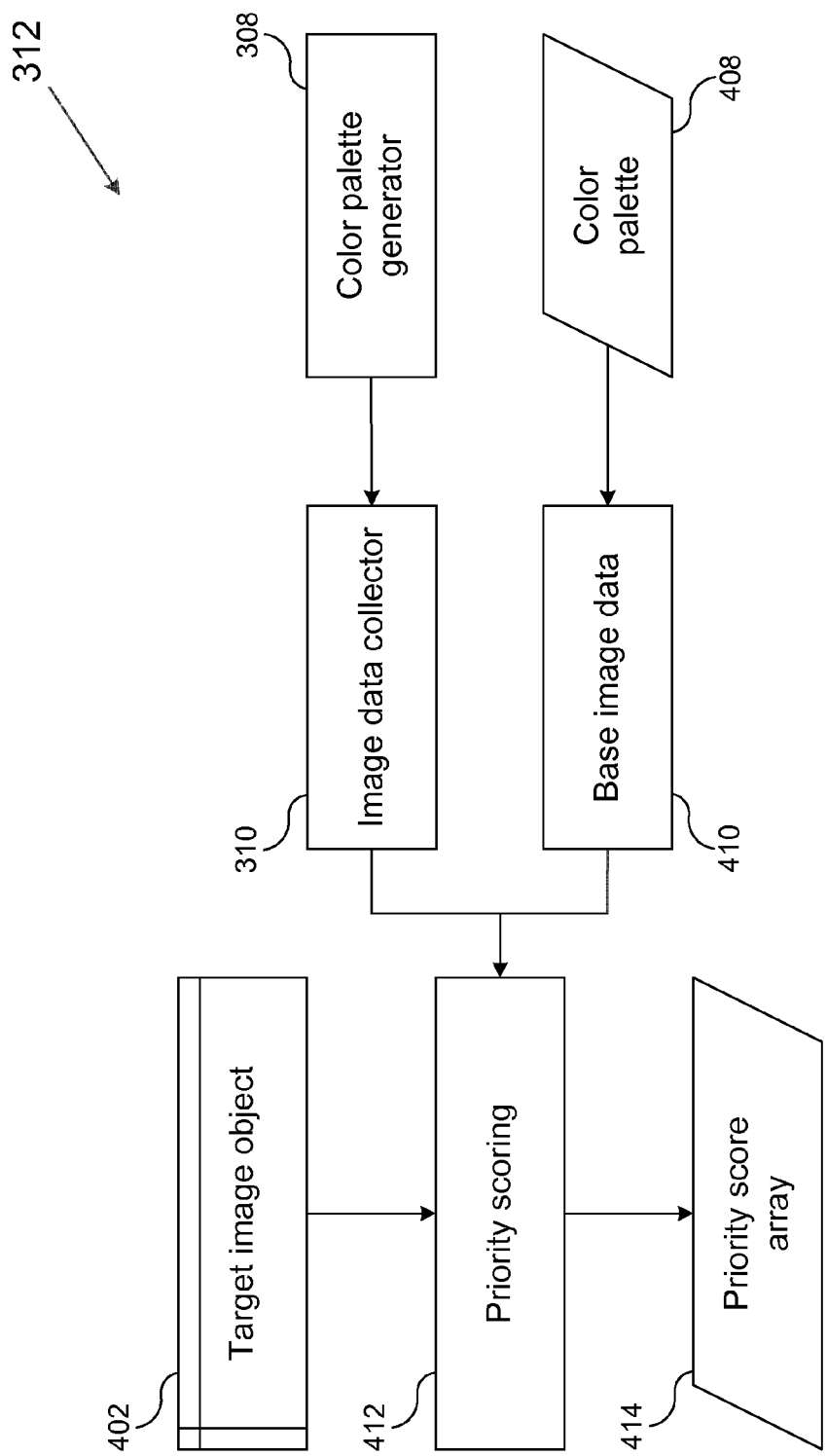
FIG. 4 is an illustrative drawing showing details of a process used by the base image prioritization block of FIG. 3 in accordance with some embodiments of the invention.

FIG. 4 is an illustrative drawing showing details of a process used by the base image prioritization block 312 of FIG. 3 in accordance with some embodiments of the invention. As described above with reference to FIG. 3, color palette generator 308 generates color palette data for a given target image object 402 currently selected by block 306 for evaluation and provides color palette data to the data collector block 310. For each of the multiple base images to be evaluated for phishing abuse, color palette information 408 produced in accordance with the process of FIG. 1 is obtained from database 116 and is provided to base image data block 410. Priority scoring block 412 determines a priority score for each base image by extracting color palette information from block 310 and comparing that information with color palette information from block 410 for each base image. If a target image has a color that matches one of base image colors, the score for that base image as associated with the given target image is incremented by one; if a target image has two colors that match two base image colors, the score is incremented by two, etc. In this manner, a score representing a percentage of matching colors is calculated between the given target image and each base image, and a corresponding priority is assigned as a score for each base image. The result is a series of scores—one per base image. The scores are sorted by highest score on top and are stored in a priority score array 414, which is accessed by decision block 314 of FIG. 3 to determine the order in which to evaluate target images. Prioritization in this manner ensures that the most likely base image candidates for phishing abuse are checked first, which reduces the number of required scan cycles. Moreover, base images with a priority score below some prescribed minimum threshold are not included in the priority score array 414 and are not evaluated, speeding the overall process. In some exemplary cases, the score for matching colors can be weighted (e.g., by the number of pixels of a certain color or the relative positions of the pixels of a certain color).

Figure 5:
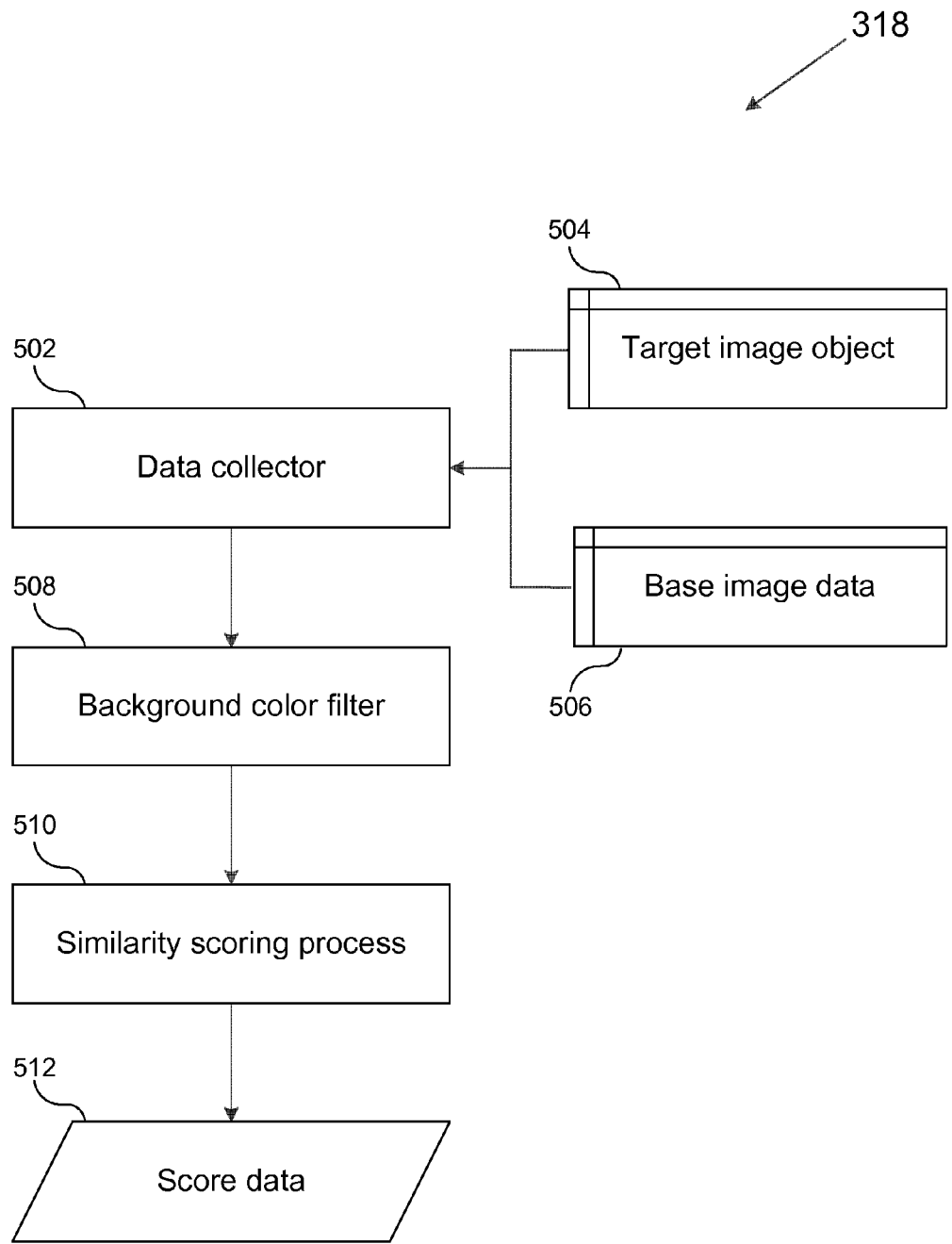
FIG. 5 is an illustrative drawing showing details of an image evaluation process of block of FIG. 3 in accordance with some embodiments of the invention.

FIG. 5 is an illustrative drawing showing details of an image evaluation process of block 318 of FIG. 3 in accordance with some embodiments of the invention. Referring to FIG. 3, decision process 314 selects the base image with the highest overall priority score that has not yet been evaluated against a currently selected target image. As will be appreciated from FIG. 3, the target image is compared against all base images that have a minimum qualifying priority score, starting with the highest scored. More specifically, data collector 502 obtains a target image object 504 selected from the web page under investigation and obtains base image information 506 from database 116. Background filter block 508 removes background color values from the target image (in correspondence to the removal of background color values from the base image as described above with reference to FIG. 1). Block 510 performs a comparison of the currently selected target image to the currently selected base image in order to assess a level of similarity between the two. Similarity measurement results are collected in block 512 for use by decision block 320.

Figure 6:
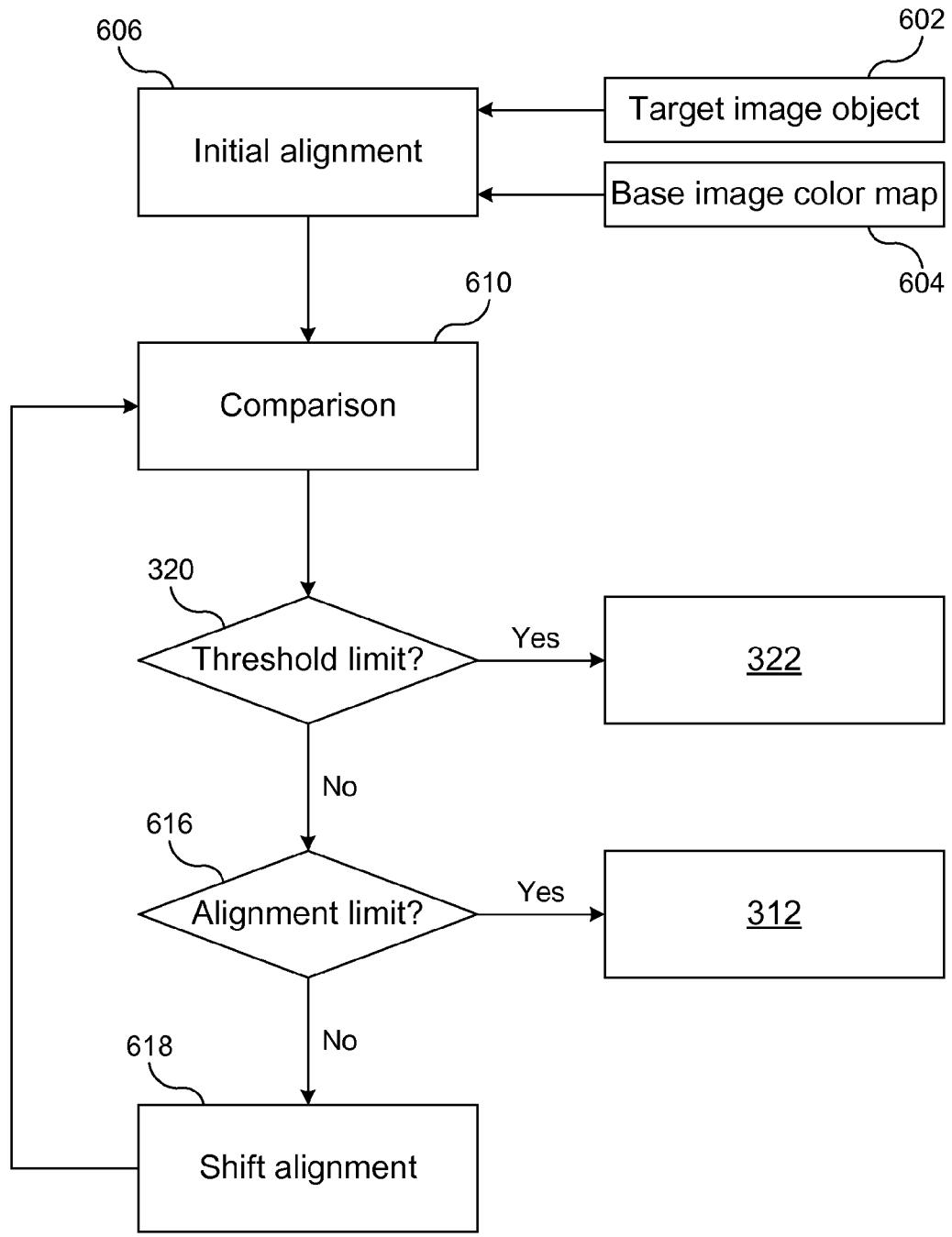
FIG. 6 is an illustrative drawing showing details of the comparison process of block of FIG. 5 in accordance with some embodiments of the invention.

FIG. 6 is an illustrative drawing showing details of the comparison process of block 510 of FIG. 5 in accordance with some embodiments of the invention. The currently selected target image 602 and a base image color map (e.g., FIG. 2B) of the currently selected base image 604 are provided to an initial alignment block 606, which establishes an initial alignment of pixel color values of the target image object with pixel color values of the base image color map. The initial alignment is done by taking the first n pixels, where n is the pixel width of the base image so that these n pixels would correspond to the first row of the base image, and aligning them with the first n pixels of the target image, and continuing row by row (e.g, as described below with reference to FIG. 7). Comparison block 610 compares pixel color values of the base image color map sample (e.g., FIG. 2C) with pixel values of the target image as currently aligned. That is, only color map sample values are used in the comparison, where the sample size can be chosen as described above. Decision block 320 makes a determination as to whether the number of matching color values meets a threshold value indicative of there being a match between the currently selected target image and the selected base image. (Note that decision block 320 is a part of block 510, which is embedded within the process of FIG. 3.) If decision block 320 makes a determination that the threshold has been met, then block 322 flags the web page containing the currently selected base image as a suspected phishing abuse web page, as explained above with reference to FIG. 3. If decision block 320 determines that the threshold has not been met, then decision block 616 determines whether the current alignment meets an alignment limit. If decision block 616 makes a determination that the alignment limit has been met, then the process returns to block 312 shown in FIG. 3. If decision block 616 determines that the alignment limit has not yet been met, then block 618 shifts the relative position of the target image and the base images to a next prescribed alignment, and the process loops back to the comparison block 610.

More particularly, the shift alignment block 618 implements a scan process in which alignment of the selected base image is shifted incrementally relative to the target image. At each incremental shift position, comparison block 610 determines the number of base image pixel locations that have associated color values that match color values of target image pixel values that they are aligned with. The comparison involves a pixel value scanning process in which the color value of one pixel location after another in the base image is compared with the color value of the target image pixel location currently aligned with it. At each incremental shift position, the threshold limit decision block 320 determines whether the number of matches meets a prescribed threshold limit. It will be appreciated that multiple pixels locations at a time may be evaluated simultaneously (in parallel) during the scan operation consistent with the principles of the invention.

For example, in some embodiments, the first scan pass begins by comparing the color of first pixel in target image with color of first pixel in base image by applying a XOR operation:

baseColorMap[0][0]^targetColorMap[0][0]

A result of "0" indicates a match and a running tally is incremented by one. Subsequently the scan continues such that each n-th pixel of target image is compared against the corresponding n-th pixel of base image and the tally is updated. This continues until the last pixel is reached. As discussed above, the pixel comparisons are typically only made at values corresponding to the base color map sample so that the indices of the color maps are accessed accordingly.

In a next pass, for example, n is offset by one (1) (the offset value is configurable) in the target image, so that target pixel n+1 is compared to base pixel n. With each pass, the base color map continues to increment the offset by one (1) pixel, until last element of base color map is offset far enough to match against the last element of target color map. Note: it is not required to always offset by one (1) pixel to get sufficiently good results. Tests have shown that even ten (10) pixel offsets can produce good results, while greatly speeding up the scanning operation. This offset scanning technique ensures that a base image can be accurately detected if it is present in a target image, which may contain other image elements, such as in a composite image.

Each pass is scored separately. Once a threshold score (a configurable value) is reached, scanning stops and block 322 reports a "positive match" result. If the minimum score is not achieved, then the process of FIG. 3 moves to the next base image and then to the next target image.

Figure 7A:
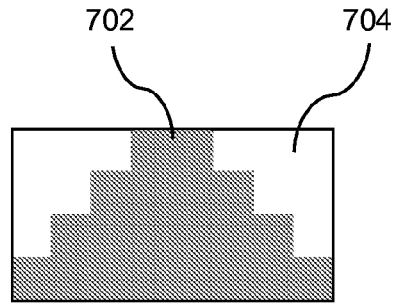
FIGS. 7A-7E are illustrative drawings of an example base image (FIG. 7A) and target image (FIG. 7B) and three example alignments (FIGS. 7C-7E) of the two images during the comparison process of FIG. 6 in accordance with some embodiments of the invention.
Figure 7B:
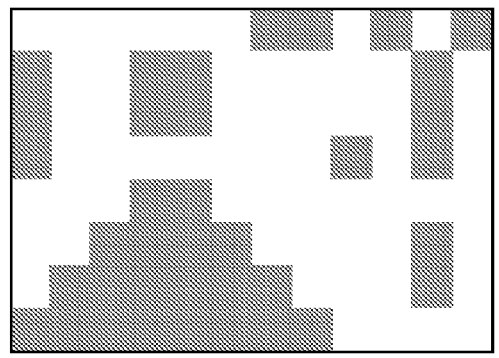

The process of FIG. 6 will be better understood through the following explanation of the illustrative drawings of FIGS. 7A-7E. FIGS. 7A-7E are illustrative drawings of an example base image (FIG. 7A) and target image (FIG. 7B) and three example alignments (FIGS. 7C-7E) of the two images during the comparison process of FIG. 6 in accordance with some embodiments of the invention. FIG. 7A is an illustrative drawing of an example base image color map (e.g., corresponding to the example base image of FIG. 2A). Specifically, the grey shaded regions 702 represent pixel locations having base image color values. The 'white' spaces 704 are background. FIG. 7B is an illustrative drawing of an example target image color map for a target image collected from a web page that is under investigation. Specifically, the grey shaded regions represent pixel locations having target image color values.

In FIGS. 7A-7E the pixel dimension are relatively small for illustrative purposes. In FIG. 7A the base image includes a rectangular array of eight (8) pixels in the horizontal direction and four (4) pixels in the vertical direction, so that there are thirty-two (32) pixels in the base image with twenty (20) pixels in the grey-shaded region 702 (denoting base image color values) and twelve (12) pixels in the white region 704 (denoting background). In FIG. 7B the target image includes a rectangular array of twelve (12) pixels in the horizontal direction and eight (8) pixels in the vertical direction, so that there are ninety-six (96) pixels in the target image, Although FIGS. 7A-7E illustrate the alignment process for the "entire" base image (FIG. 7A), the calculations (e.g, XOR operations) for pixel comparisons only need to be done for pixels corresponding to the base color map sample (e.g, FIG. 2C).

Figure 7C:
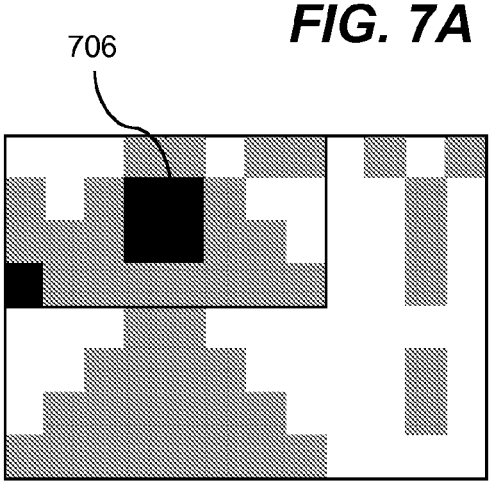
Figure 7D:
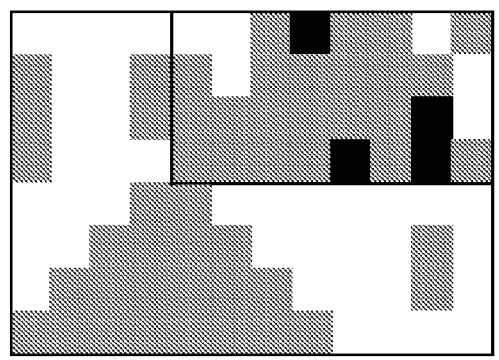
Figure 7E:
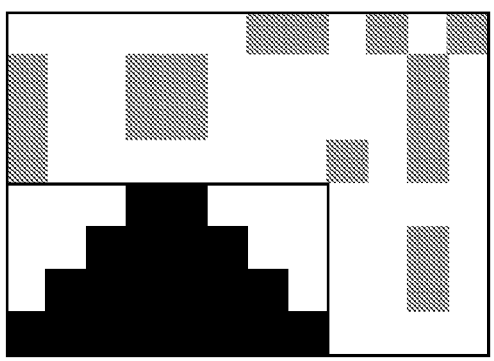

FIG. 7C is an illustrative drawing of an initial alignment selected by block 606 of FIG. 6 in which alignment of the base image color map and the target image color map is characterized as: row 1, offset 0. In this example, 'row 1' signifies that the top pixel locations of the base image are aligned with the top pixel locations of the target image, and 'offset 0' signifies that the far left pixel locations of the base image color map are aligned with the far left pixel locations of the target image. FIG. 7D is an illustrative drawing of a first shifted alignment selected by block 618 of FIG. 6 in which alignment of the base image color map and the target image color map is characterized as: row 1, offset 4 pixels. In this example, 'offset 4 pixels' signifies that the base image color map has been shifted to the right relative to the target image by four pixel locations. FIG. 7E is an illustrative drawing of a third shifted alignment selected by block 618 of FIG. 6 in which alignment of the base image color map and the target image color map is characterized as: row 2, offset 0. In this example, 'row 2' signifies that the base image color map has been offset vertically downward by four (4) pixel locations pixel locations relative to the target image color map.

The row 2, offset 0 alignment is an example of an alignment limit in that the base image color map has reached the end of the target image color map. If the evaluation process does not end sooner due to a determination that the similarity measure during at least one of the alignments meets a threshold level, then the evaluation process ends when an evaluation limit is reached. One such evaluation limit is the alignment limit. Certainly, further valuation makes little sense once substantially the entire target image already has been evaluated. Alternatively, an evaluation limit based upon factors such as the duration or extent of the evaluation process may be based upon a different metric such as the number of scan increments or some other timeout mechanism, for example.

The dark shaded regions 706 of FIGS. 7C-7E represent pixel locations having matching color values as can be determined by block 610 of FIG. 6. In this example, the alignment of FIG. 7C results in a determination that five (5) pixel locations have matching color values. The alignment of FIG. 7D results in a determination that four (4) pixel locations have matching color values. The alignment of FIG. 7E results in a determination that twenty (20) pixel locations have matching color values. Since the base image (FIG. 7A) consists of twenty (20) pixels with base image color values 702, "20" is the maximum possible score, and no further scanning is needed.

The number of pixel locations having matching color values serves as a measure of similarity between a base image and a target image. The more pixel locations having color matches the higher the likelihood that the target image resides on a web page involved with illicit phishing abuse. If some threshold number of pixel locations match, then decision block 320 of FIGS. 3 and 6 makes a determination to flag the suspect web page for additional investigation, perhaps by a human reviewer. In this example, the number of matches in each of FIGS. 7C-7D is too few to determine that phishing is suspected, but the number of matches in FIG. 7E clearly indicates phishing since there is a complete match. A threshold number of matches typically would be set at some level less than the complete overlap match shown in FIG. 7E. As noted above, the sizes of the base image color map and the target color map are typically much larger than the dimensions shown in this example and the actual comparisons are done on a reduced pixel set corresponding to the base image color map sample (FIG. 2C).

Figure 8:
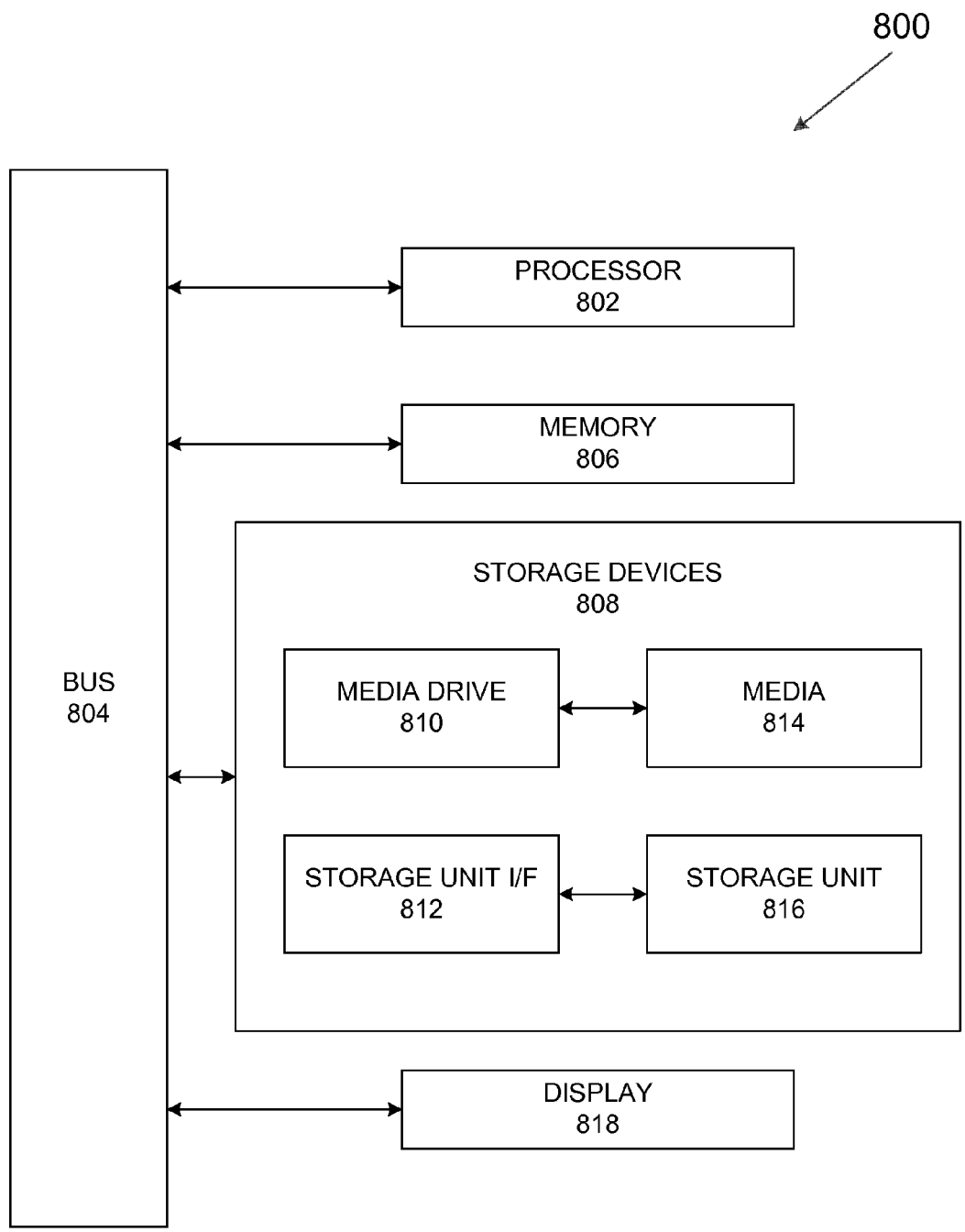
FIG. 8 is an illustrative block level diagram of a computer system that can be programmed to implement processes involved identifying potential phishing abuse images within a web page in accordance with embodiments of the invention.

FIG. 8 is an illustrative block level diagram of a computer system 800 that can be programmed to implement processes involved identifying potential phishing abuse images within a web page in accordance with embodiments of the invention. In particular, the process of FIG. 1 and of FIGS. 3-6 may be implemented as one or more computer programs encoded in computer readable media to direct the system 800 to perform such processes. Computer system 800 can include one or more processors, such as a processor 802. Processor 802 can be implemented using a general or special purpose processing engine such as, for example, a microprocessor, controller or other control logic. In the example illustrated in FIG. 8, processor 802 is connected to a bus 804 or other communication medium.

Computing system 800 also can include a main memory 806, preferably random access memory (RAM) or other dynamic memory, for storing information and instructions to be executed by processor system 802. Main memory 806 also may be used for storing temporary variables or other intermediate information during execution of instructions to be executed by processor 502. Computer system 800 can likewise include a read only memory ("ROM") or other static storage device coupled to bus 804 for storing static information and instructions for processor system 802. The main memory 806 and the storage devices 808 may store data such as base image information for a multiplicity of base images, for example. The main memory 806 and the storage devices 808 may store instructions such as instructions to implement an incremental scanning process in which a base image is compared with a target image to determine a measure of similarity between the two, for example. The main memory 806 and the storage devices 808 also may store instructions to base image information for a multiplicity of base images, for example.

The computer system 800 can also includes information storage mechanism 808, which can include, for example, a media drive 510 and a removable storage interface 812. The media drive 810 can include a drive or other mechanism to support fixed or removable storage media 814. For example, a hard disk drive, a floppy disk drive, a magnetic tape drive, an optical disk drive, a CD or DVD drive (R or RW), or other removable or fixed media drive. Storage media 814 can include, for example, a hard disk, a floppy disk, magnetic tape, optical disk, a CD or DVD, or other fixed or removable medium that is read by and written to by media drive 810. Information storage mechanism 808 also may include a removable storage unit 816 in communication with interface 812. Examples of such removable storage unit 816 can include a program cartridge and cartridge interface, a removable memory (for example, a flash memory or other removable memory module). As these examples illustrate, the storage media 814 can include a computer useable storage medium having stored therein particular computer software or data.

The computer system 800 also includes a display unit 818 that can be used to display information such as a base image or a target image or a web page. Moreover, the display unit can be used to display similarity measures for different comparisons between target images and base images.

In this document, the terms "computer readable medium," "computer program medium" and "computer useable medium" are used to generally refer to media such as, for example, memory 806, storage device 808, a hard disk installed in hard disk drive 810. These and other various forms of computer useable media may be involved in carrying one or more sequences of one or more instructions to processor 802 for execution. Such instructions, generally referred to as "computer program code" (which may be grouped in the form of computer programs or other groupings), when executed, enable the computing system 800 to perform features or functions of the present invention as discussed herein.

The foregoing description and drawings of preferred embodiments in accordance with the present invention are merely illustrative of the principles of the invention. Various modifications can be made to the embodiments by those skilled in the art without departing from the spirit and scope of the invention, which is defined in the appended claims.

I claim:

1. A method of identifying potential phishing abuse images, comprising:
    producing a first color map that represents a subset of color values and pixel locations within a base image;
    producing a second color map that represents color values and pixel locations within a target image;
    selecting an alignment the first color map with the second color map such that at least some pixel locations of the first color map align with at least some pixel locations of the second color map;
    determining a measure of color value matching of aligned pixel locations for the selected alignment;
    repeating the acts of selecting and determining until a prescribed threshold measure of color value matching is determined for at least one of the selected alignments or until an evaluation limit is reached; and
    saving one or more values for the selected alignments in a computer-readable medium.

2. A method according to claim 1, wherein producing the first color map includes sampling a threshold number of pixel locations of the base image, wherein at least some pixel locations of the base image are excluded from the first color map.

3. A method according to claim 1, further comprising:
    selecting the base image from a set of candidate base images by prioritizing the candidate base images according to color similarity with the target image.

4. A method according to claim 1, wherein selecting the alignment of the first color map with the second color map includes:
    aligning a first pixel of the first color map with a first pixel of the second color map; and
    aligning additional pixels of the first color map with additional pixels of the second color map according to locations of the additional pixels in the first pixel map relative to the first pixel of the first color map and locations of the additional pixels in the second color map relative to the first pixel of the second color map.

5. A method according to claim 1, wherein determining the measure of color value matching for the alignment includes calculating a sum of color matching values for pairs of aligned pixels, wherein the color matching values correspond to a degree of similarity in the color values of aligned pixels.

6. A method according to claim 1, wherein the alignment is a first alignment and the method further comprises: selecting a second alignment of the first color map with the second color map, wherein selecting the second alignment includes:
    aligning the first pixel of the first color map with a second pixel of the second color map; and
    aligning additional pixels of the first color map with additional pixels of the second color map according to locations of the additional pixels in the first color map relative to the first pixel of the first color map and locations of the additional pixels in the second color map relative to the second pixel of the second color map.

7. A method according to claim 6, further comprising selecting the second pixel of the second color map by offsetting the first pixel of the second color map along a row or a column of the second pixel map.

8. An apparatus for identifying potential phishing abuse images, the apparatus comprising a computer for executing computer instructions, wherein the computer includes computer instructions for:
   producing a first color map that represents a subset of color values and pixel locations within a base image;
   producing a second color map that represents color values and pixel locations within a target image;
   selecting an alignment the first color map with the second color map such that at least some pixel locations of the first color map align with at least some pixel locations of the second color map;
   determining a measure of color value matching of aligned pixel locations for the selected alignment; and
   repeating the acts of selecting and determining until a prescribed threshold measure of color value matching is determined for at least one of the selected alignments or until an evaluation limit is reached.

9. An apparatus according to claim 8, wherein the computer includes a processor with memory for executing at least some of the computer instructions.

10. An apparatus according to claim 8, wherein the computer includes circuitry for executing at least some of the computer instructions.

11. An apparatus according to claim 8, wherein producing the first color map includes sampling a threshold number of pixel locations of the base image, wherein at least some pixel locations of the base image are excluded from the first color map.

12. An apparatus according to claim 8, wherein the computer further includes computer instructions for:
   selecting the base image from a set of candidate base images by prioritizing the candidate base images according to color similarity with the target image.

13. An apparatus according to claim 8, wherein selecting the alignment of the first color map with the second color map includes:
   aligning a first pixel of the first color map with a first pixel of the second color map; and
   aligning additional pixels of the first color map with additional pixels of the second color map according to locations of the additional pixels in the first pixel map relative to the first pixel of the first color map and locations of the additional pixels in the second color map relative to the first pixel of the second color map.

14. An apparatus according to claim 8, wherein determining the measure of color value matching for the alignment includes calculating a sum of color matching values for pairs of aligned pixels, wherein the color matching values correspond to a degree of similarity in the color values of aligned pixels.

15. An apparatus according to claim 8, wherein the alignment is a first alignment and the computer further includes computer instructions for selecting a second alignment of the first color map with the second color map, wherein selecting the second alignment includes:
   aligning the first pixel of the first color map with a second pixel of the second color map; and
   aligning additional pixels of the first color map with additional pixels of the second color map according to locations of the additional pixels in the first color map relative to the first pixel of the first color map and locations of the additional pixels in the second color map relative to the second pixel of the second color map.

16. A non-transitory computer-readable medium that stores a computer program for identifying potential phishing abuse images, wherein the computer program includes instructions for: producing a first color map that represents a subset of color values and pixel locations within a base image; producing a second color map that represents color values and pixel locations within a target image; selecting an alignment the first color map with the second color map such that at least some pixel locations of the first color map align with at least some pixel locations of the second color map; determining a measure of color value matching of aligned pixel locations for the selected alignment; and repeating the acts of selecting and determining until a prescribed threshold measure of color value matching is determined for at least one of the selected alignments or until an evaluation limit is reached.

17. A non-transitory computer-readable medium according to claim 16, wherein producing the first color map includes sampling a threshold number of pixel locations of the base image, wherein at least some pixel locations of the base image are excluded from the first color map.

18. A non-transitory computer-readable medium according to claim 16, wherein the computer program further includes instructions for: selecting the base image from a set of candidate base images by prioritizing the candidate base images according to color similarity with the target image.

19. A non-transitory computer-readable medium according to claim 16, wherein selecting the alignment of the first color map with the second color map includes:
   aligning a first pixel of the first color map with a first pixel of the second color map; and
   aligning additional pixels of the first color map with additional pixels of the second color map according to locations of the additional pixels in the first pixel map relative to the first pixel of the first color map and locations of the additional pixels in the second color map relative to the first pixel of the second color map.

20. A non-transitory computer-readable medium according to claim 16, wherein determining the measure of color value matching for the alignment includes calculating a sum of color matching values for pairs of aligned pixels, wherein the color matching values correspond to a degree of similarity in the color values of aligned pixels.

* * * * *